July 9, 1929.  J. REECE ET AL  1,720,236

POWER TRANSMISSION

Filed Sept. 1, 1927   5 Sheets-Sheet 1

Inventors.
John Reece
Franklin A. Reece
by Rogers, Kennedy & Campbell
Attys.

Inventors.
John Reece
Franklin A. Reece
by Rogers, Kennedy & Campbell
Attys.

July 9, 1929.　　J. REECE ET AL　　1,720,236
POWER TRANSMISSION
Filed Sept. 1, 1927　　5 Sheets-Sheet 3

Inventors.
John Reece
Franklin A. Reece
by Rogers, Kennedy & Campbell
Attys.

July 9, 1929.  J. REECE ET AL  1,720,236
POWER TRANSMISSION
Filed Sept. 1, 1927   5 Sheets-Sheet 4

Inventors.
John Reece
Franklin A. Reece
by Rogers, Kennedy & Campbell
Attys.

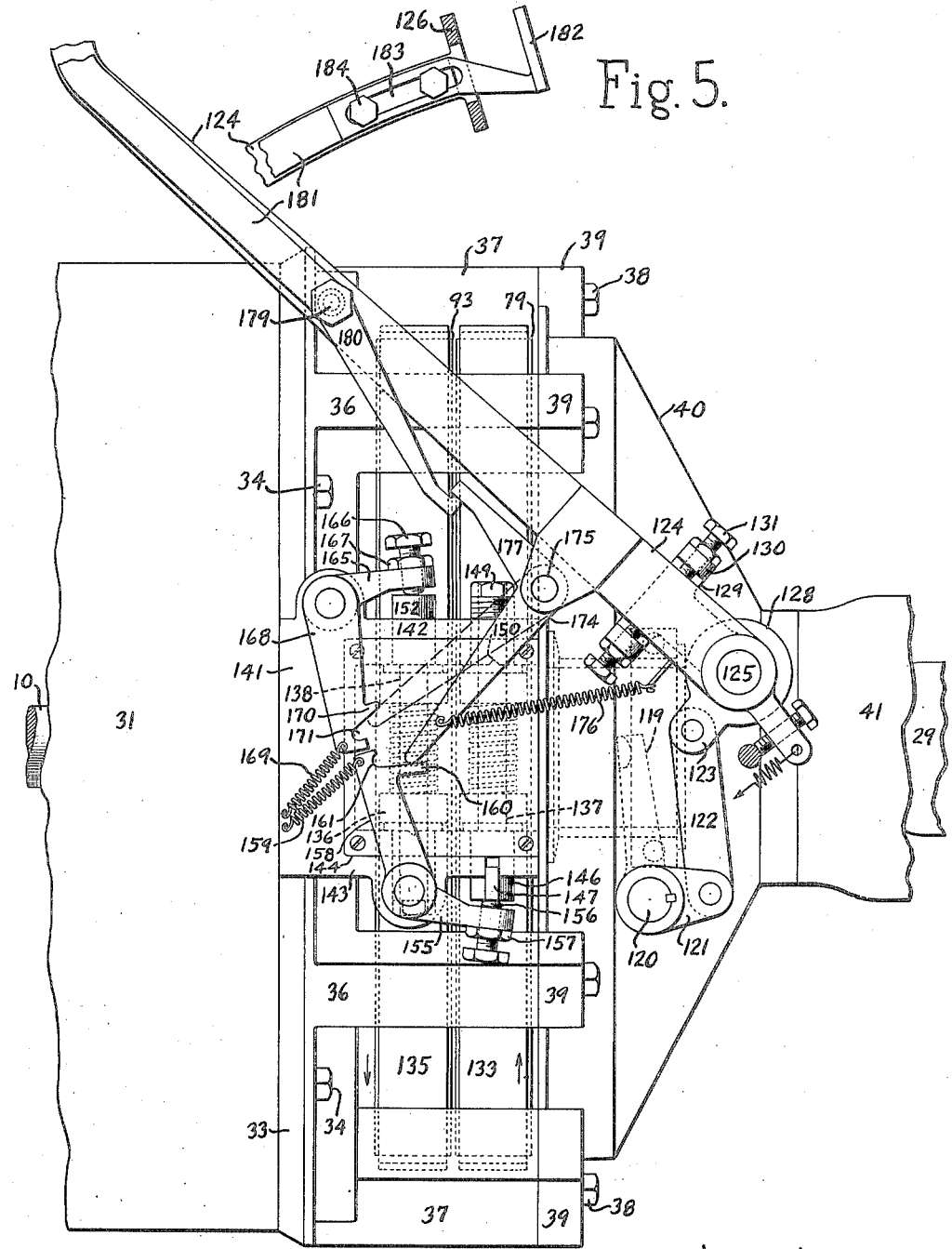

Patented July 9, 1929.

1,720,236

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed September 1, 1927. Serial No. 216,988.

This invention relates to power transmission and involves a novel apparatus for the mechanical transmission of power, for example from a suitable source of power or driving shaft to a driven shaft or other load, in a variable manner.

The invention is herein shown illustratively applied to the class of power transmission disclosed in our prior Patent No. 1,551,692 of September 1, 1925, and involving the underlying principles disclosed in Patent No. 1,546,404 of July 21, 1925; although it is to be understood that the present invention and certain features thereof are available with other classes of transmission. A typical purpose for which the invention is useful is as a part of the transmission of a motor vehicle or analogous use where the load is variable and it is desirable that the speed ratio and torque ratio should vary to correspond. The present disclosure therefore may be assumed to be herein illustratively applied to the motor vehicle type of transmission, especially for motor vehicles driven by internal combustion engines through a fly wheel and with the engine speed or power controlled by throttle. The general conditions and requirements of such transmissions have been set forth in the specifications of said prior patents to which reference may be had.

The general object of the present invention is to afford a power transmission apparatus adapted to meet the requirements referred to with efficiency of transmission, smoothness of operation, convenience of control and compactness and strength of structure. A particular object hereof is to afford a power transmission apparatus wherein, in addition to the normal or full speed forward drive adjustment, is a slow speed forward drive adjustment, giving high power for emergencies, and a slow speed reverse drive adjustment, either of which may be put into effect with ease and convenience of control and to afford smoothness and effectiveness of action.

A further object of the invention is to provide an efficient and convenient manual or pedal control, of selective action, which may be readily thrown in such a manner as to shift from the normal forward drive either to the slow drive or to the reverse drive. Other and further objects and advantages of the present invention will be explained in the hereinafter following description of an illustrative embodiment thereof or will be understood to those conversant with the subject matter of mechanical power transmission. To the attainment of the aforesaid objects and advantages the present invention consists in the novel power transmission apparatus, and the novel features of combination, operation, arrangement, structure, design and detail herein illustrated or described.

In the accompanying drawings Fig. 1 may be considered as a central longitudinal section of a power transmission apparatus embodying the present invention, taken however on different planes in its upper and lower halves, as indicated by the broken line 1—1 of Fig. 2, the parts which are in full being viewed from the left side of the vehicle.

Fig. 5 is an exterior left elevation showing more especially the selective control or pedal mechanism.

Figure 1:
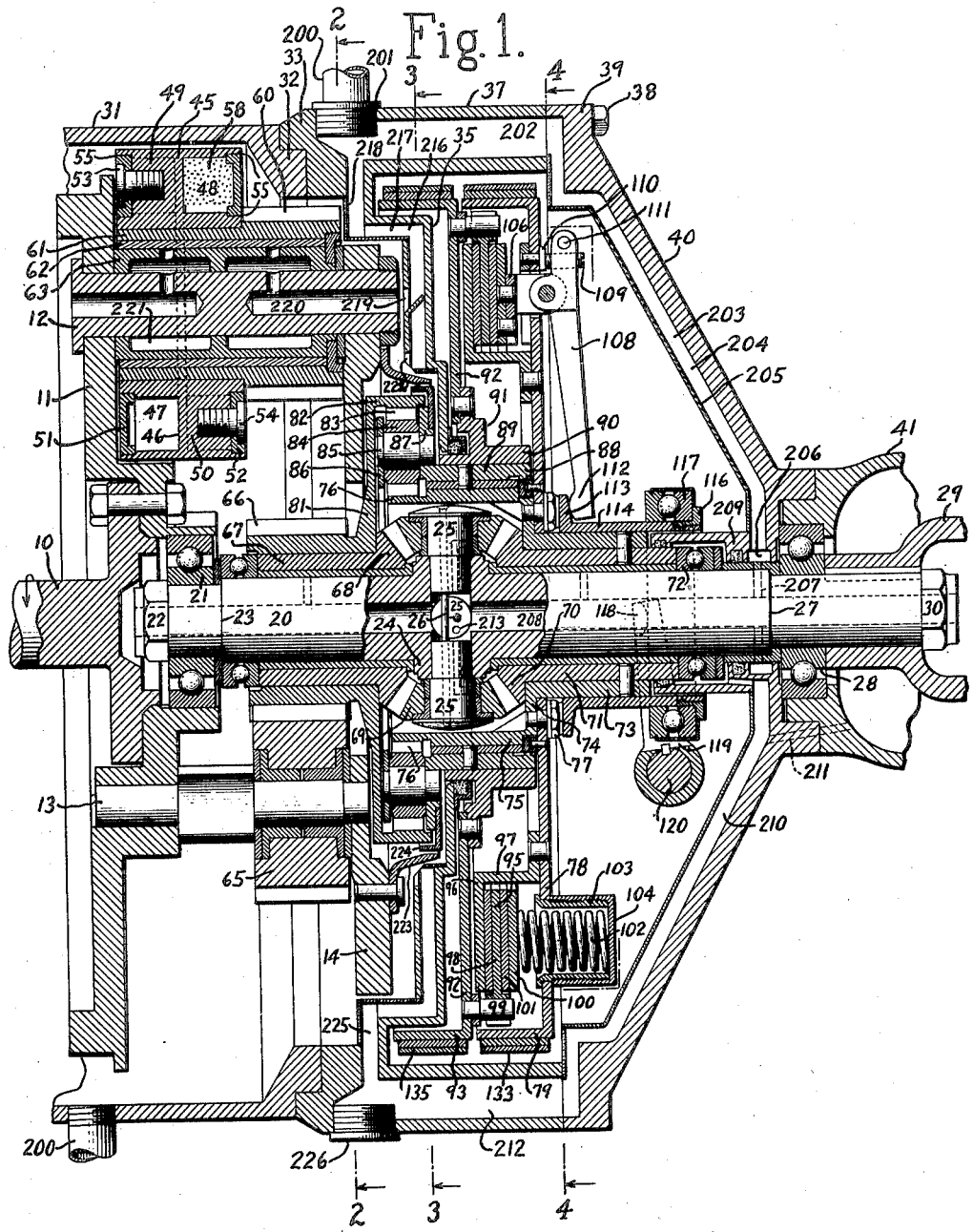

In the several figures the parts are shown in adjustment for normal forward drive.

It will be convenient first to describe the driving or power parts of the apparatus, then the driven parts, then certain stationary casing parts, then the transmitting mechanism between the driving and driven parts and finally the control or pedal mechanism for effecting the desired alterations of drive.

Referring first to the driving parts, these comprise the shaft 10, representing the source of power such as the internal combustion engine of a vehicle, the shaft carrying a large revolving support or disk 11 on which are mounted various elements as will be described, which, taken together, possess considerable mass and may be considered as a skeleton fly wheel, giving the fly wheel effect which is substantially essential for motors of the internal combustion class. The revolving disk or support 11 is shown as supporting a number of main studs 12, arranged parallel with the general axis of revolution or engine shaft, and serving to carry the carriers or planetating rotors or planetors, as they may be called, to be described. Six of such studs are shown, to accommodate six such carriers, preferably arranged as three opposite and balancing pairs. The fly wheel disk 11 is shown as supporting also a system of studs 13, three of them being shown, each arranged to carry an intermediate or idler pinion for effecting planetation of two of the planetors. The six main studs and the three idler studs are all shown as connected at their rear ends with a circular bridge or enclosing ring 14, the assembly being secured into a rigid and unitary whole by nuts 15 placed upon the rear threaded ends of the main studs 12.

The driven parts comprise the driven shaft 20 and parts turning with it. This shaft is shown hollow for oil circulation purposes. Its front end, at the left of Fig. 1, is provided with a ball bearing 21, between it and the revolving support 11, confined by a nut 22 in front and a shoulder 23 formed on the shaft to the rear. At a convenient point in its length, preferably to the rear of the assembled driving parts, the driven shaft is formed into an enlargement 24, bored at right angles in two directions to receive four pinion studs 25, each opposite pair of studs being tied or secured together by an elongated tie rod or rivet 26. Further to the rear the driven shaft is formed with a rear shoulder 27 against which is confined a ball bearing 28 by a member 29, which may be a portion of the usual universal connection by which the driven shaft of the transmission is connected to the propeller shaft of the vehicle. The part 29 is shown keyed to the driven shaft and confined thereon by an end nut 30 threaded upon the shaft. It will be understood that the connection 29 may drive through the propeller shaft to the usual rear axle gearing, by which the vehicle wheels are driven differentially, and at such a reduced speed that a mean working speed of the engine affords a mean vehicle speed.

Some of the stationary casing or frame parts include the following. Surrounding the fly wheel or driving elements is shown a cylindrical casing 31 which may be similar to the usual casing of any vehicle fly wheel or transmission. Interlocked with the enlarged rear end or ring 32 of the wall 31 is an annular wall element or ring 33 attached by bolts 34. The ring 33 has a wall extension 35 extending inwardly then rearwardly then inwardly, located between and separating two portions of the interior mechanism. From the ring 33 extend rearwardly a number of frame parts or bars 36, and other larger bars 37, the latter being hollow for oil circulation. These bars 36 and 37 bridge the space surrounding the central mechanism and are connected by bolts 38 with enlargements 39 of a rear casing wall 40. The casing wall 40 is of conical form inclining inwardly and rearwardly to where it connects with an additional casing element 41, the two being interlocked and enclosing the outer race of the ball bearing 28, and the universal joint 29 being enclosed in the casing portion 41, which may connect with extension casings for the propeller shaft etc. Other fixed frame parts and walls will be referred to hereinafter.

Referring next to the transmitting means between the driving and driven members or shafts, the present disclosure shows six substantially identical mass carriers, rotors or planetors 45, spaced in balanced relation about the general axis and mounted respectively on the six studs 12 supported on the revoluble support 11. Each rotor is shown as a hollow structure, and is formed with a transverse partition 46 dividing the space into a front channel 47 and a rear channel 48, these channels being annular as in said Patent 1,546,404. Each of the channels constitutes a guide for one centrifugal mass or portion thereof, and is representative of any suitable guide, and as in said patent there may be more than two of such guides or channels on each rotor. Each guiding channel of each rotor is shown provided with, or closed at one point by, what may be termed a mass receiving pocket or abutment, or thrusting means, namely the abutments or thrusters 49 in the front channel and 50 in the rear channel, adapted to hold and carry or force the respective masses inwardly or against their existing centrifugal force.

Figure 2:
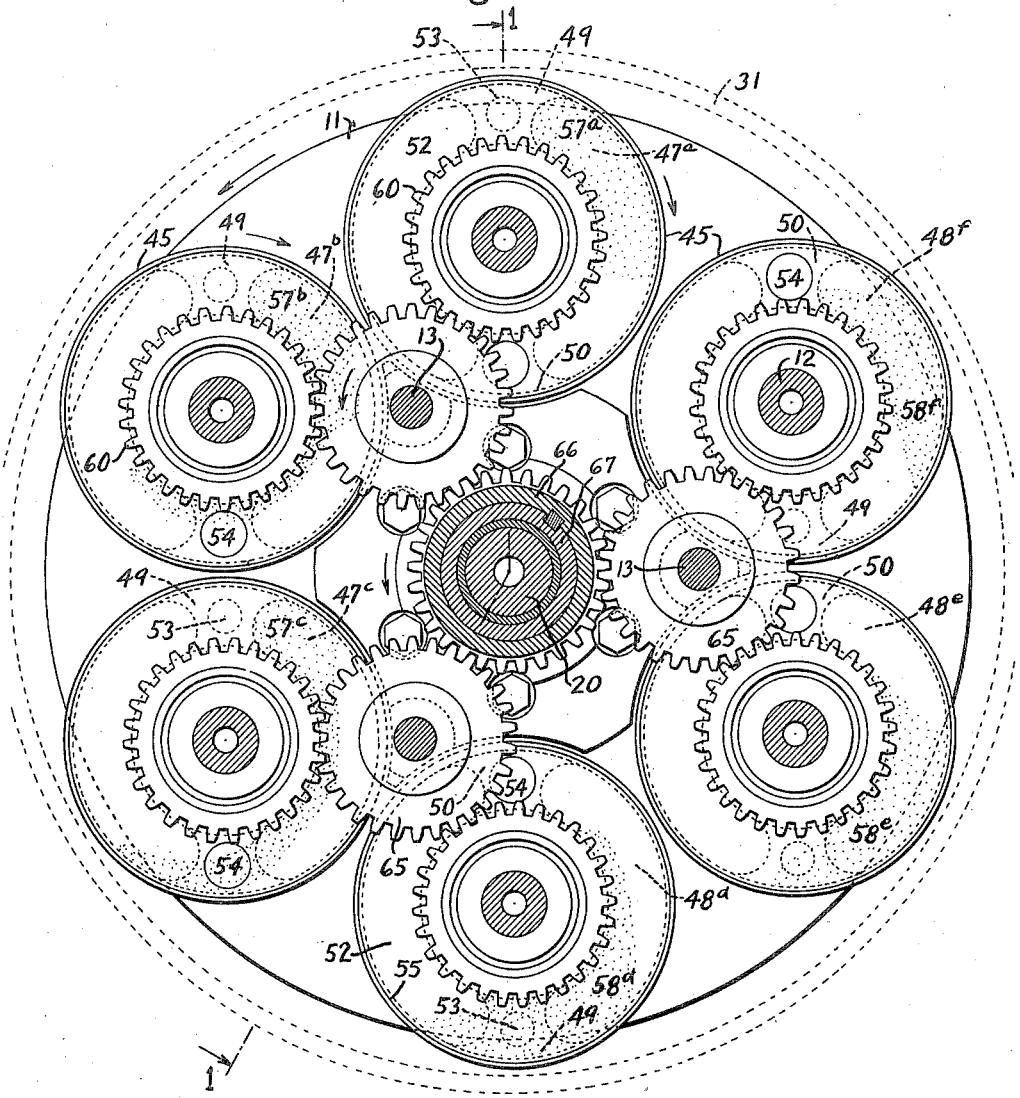
Fig. 2 is a transverse cross section looking from the rear, that is from the right side of Fig. 1, taken on the plane 2—2 of Fig. 1, with the outer and fixed casing parts omitted, except as partly shown in dotted lines.

The respective mass holding and thrusting elements 49 and 50 in each rotor are spaced at different angular positions, shown as 180° apart, so as to give successive thrusts and a balanced action, and to minimize vibration. Indeed, as seen in Fig. 2 the thrusting elements 49 and 50 in three of the rotors may be arranged in reverse manner to those in the other three, so as to give not merely rotary but axial balance in the operation of the entire set of rotors.

Each rotor, at its front side, and closing the channel 47, is provided with a closure plate or cover 51, and the rear side of the rotor and channel 48 are similarly closed by a rear plate or cover 52. The cover plates are attached by screws 53 and 54 extending into the front and rear abutments 49 and 50. The two channels are preferably tightly sealed and may be welded along their inner and outer meeting lines 55. Each front channel or guide is supplied with a centrifugal mass or flowing weight 57 and each rear channel with a similar and equal mass 58; and these may be charged into the channels before the sealing of the covers, or may be charged through filling openings in the abutments 49 and 50 and thereafter sealed by the screws 53 and 54. If desired the air may be exhausted from the channels to minimize reactions or frothing of the flowing masses.

Each carrier or rotor is actuated or planetated by reaction from the driven elements of the mechanism, and for this purpose a planet gear 60 is associated with each rotor, a common hub 61 being shown keyed to the rotor and integral with the gear. The hub 61 is shown as provided with a lining sleeve 62 which in turn rotates upon a perforated and hollow bushing 63 surrounding the planet stud 12.

Figure 3:
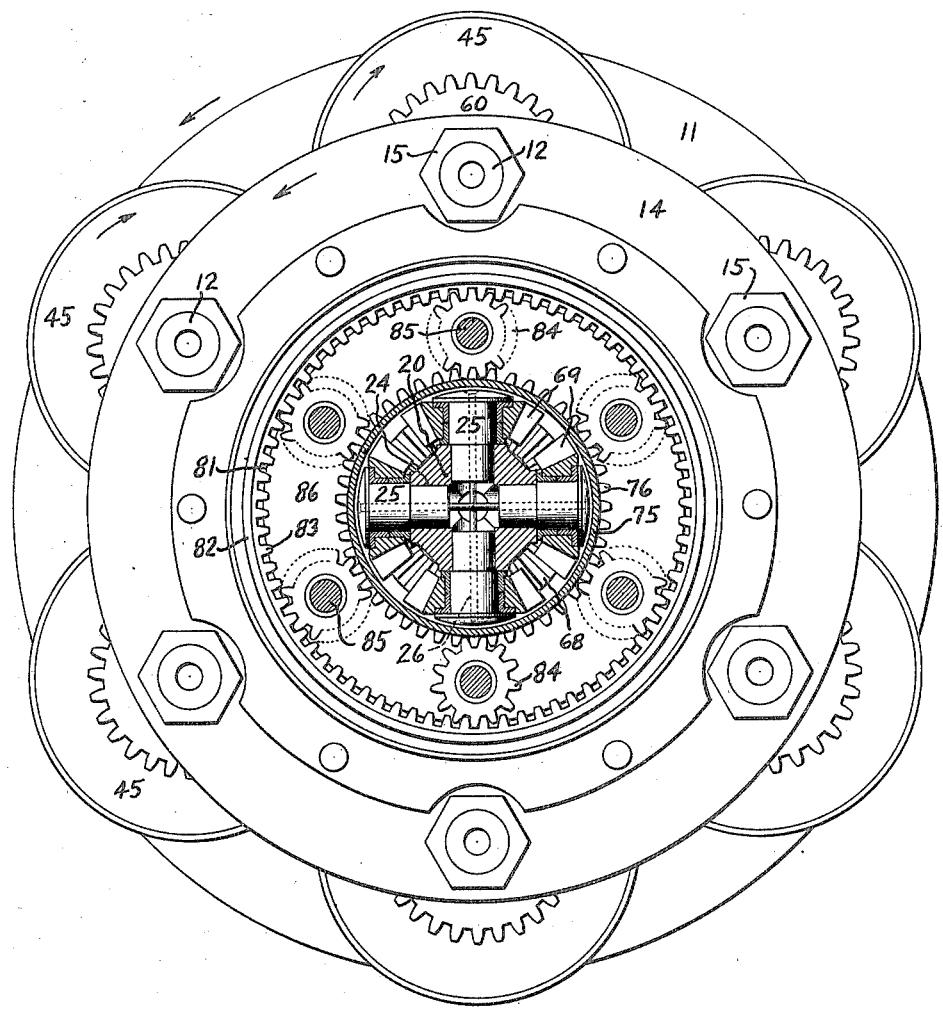
Fig. 3 is a similar transverse section taken on the plane 3—3 of Fig. 1, with casing omitted.

The actuation of the several rotors may be effected from the driven parts through idler pinions 65 engaging with the planet gears 60 and with a central gear 66, which latter may be considered as fixed upon or rigid with the driven shaft 20 during normal forward drive. Three of the idler pinions 65 are shown, mounted on the idler studs 13, and the effect of these intermediate pinions, as explained in the prior patents, is to cause a planetary rotation of the rotors in a direction opposite to their revolution about the main axis. Thus in the rear views Figs. 2 and 3, the revolving support 11 and connected fly wheel parts turn counterclockwise, while the several rotors turn clockwise. As proportioned, with the central and planet gears of substantially the same diameter, each rotor will make one planetating rotation for each revolution, assuming the central gear held stationary; or when the central gear is being turned, one rotation for each gain of one revolution of the driving parts over the central gear, with no rotation of the rotors when the driving and driven parts are turning at the same speed. This ratio of 1 to 1 is satisfactory, or a smaller rate of planetary rotation to each revolution, but not a substantially higher rate which may impair the centrifugal action and transmission.

The normal forward driving action may now be considered by supposing the driven parts and central gear 66 to be held stationary, so that the revolution of the support 11 carries the rotors counterclockwise, while each of them rotates clockwise. The centrifugal mass within each guide or channel in each of the rotors passes through certain actions which may be considered in two phases, each mass being forced inwardly against its centrifugal force during the first or transmitting stage, and returning outwardly in its second or idle phase, to be again engaged by the abutment when overtaken and thrust again inwardly for repetition of cycle.

The action is approximately indicated in a diagrammatic manner for convenience on Fig. 2 where one of the flowing masses is selected in each of the six rotors to show the progressive changes of position and action. The rotor which is at the top of the figure carries, within the front channel 47$^a$, a flowing mass 57$^a$, which is being pushed inwardly by the thrusting abutment 49. The flowing mass is indicated by stippling and may consist of small steel balls in a suitable lubricant such as crank case oil, or may consist of a mixture of mercury, white lead and oil, or other mass of suitably large specific gravity and freedom of movement. The inward thrusting action upon the mass 57$^a$ has clearly begun prior to reaching the position or stage shown in Fig. 2, the center gravity of the mass having indeed been here thrust inwardly nearly 45°.

As the thruster 49 continues its rotation, moving inwardly around the planetating path, it approaches and attains a position sufficiently illustrated by the next rotor to the left, where the mass 57$^b$ in the channel 47$^b$ has been thrust further inwardly, toward the general axis, while its centrifugal force has been delivering a reacting thrust transmitted to the driven shaft. At this point part of the mass has commenced to be released or discharged from the thruster and to pass around and outwardly at the opposite side of the channel. A later position is indicated in the third rotor where the mass 57$^c$ has been substantially half discharged around from the active to the idle side of the channel 47$^c$. The next succeeding stage or position is indicated by the lowermost rotor where the mass 58$^d$ in the rear channel 48$^d$ has been effectively wholly discharged, terminating the first phase and reaction between the thruster and the mass, the latter being in the process of accumulating at the outer portion of the channel. In the next stage the mass 58$^e$ has substantially entirely accumulated in an idle part of the channel 48$^e$, and is in readiness for the thruster to come around and pick it up again for another inward thrusting action. In the sixth position the abutment 50 has moved outwardly and begun to overtake the mass 58$^f$ in the channel 48$^f$ so that the reaction has commenced by which the centrifugal force of the mass, thrusting against the abutment 50, is tending to oppose the rotation of the rotor. This action increases progessively to the original or first described position, whereupon the entire cycle is repeated.

The action is not only well balanced as described, by reason of the employment of three opposite pairs of rotors, each pair being in reverse arrangement in regard to the arrangement of the abutments, but a substantially continuous transmission is afforded by reason of the overlapping actions of the series of transmitting thrusts. It will be clear from the description just given that each mass effects transmission through considerably more than 180° of the motion of its rotor and abutment. The action starts easily and gradually beginning at 48$^f$, comes up to full driving action near or beyond 47$^a$, and thereafter commences gradually to decrease as the discharge of mass begins as at 47ᵇ, the transmitting thrust becoming zero at some point between the positions of 47ᶜ and 48ᵈ. The transmission through each mass therefor, while not continuing through its entire cycle, is smooth and easy throughout. Each rotor contains two channels with oppositely spaced abutments and masses, with the result that the two transmitting actions therein will overlap and will afford continuous driving transmission. This however might not be wholly smooth, but would tend to pulsation of drive, which however is wholly overcome by the employment of three opposite pairs of rotors operating in rotation. The resulting action is that during each rotation of the rotors there are six overlapping transmitting actions, with two opposite rotors and masses taking part in each of the six actions. The resulting transmission is therefore eminently smooth and even, without perceptible pulsation in transmitted energy or drive.

Assuming the central gear 66 to be rigid with the driven shaft during the result of the described actions will be a driving thrust upon the latter with a turning force or torque which is variable and self adjustable to the load encountered. If the load is so light that the power of the engine can drive the driven parts at the full speed of the engine shaft, as under ordinary road conditions, there will be no planetation of the rotors. The masses and abutments, or half of them, will assume positions wherein the total centrifugal thrust is in static equilibrium against the resistance of the load, and the entire transmission rotates as a unit without internal play. Where the load or drag becomes too great for such unit ratio drive the driven shaft will slow down, and this will produce planetary motion of the rotors with a speed corresponding with the speed difference between the driving and driven shafts. The slower the driven shaft turns with respect to the driving shaft, due to increase of resistance or load, the faster will the rotors planetate, and therefore the more effectively will the centrifugal force of the several masses operate to resist the planetation and thereby to produce an increased forward thrust upon the driven parts. The mechanism therefore delivers variable speed in a self adjusting manner, which may be considered as semi-automatic in the sense that the transmitted torque and driven speed can always be varied at will by more or less opening or closing the throttle of the engine.

It is desirable in any transmission, including the class herein described, to provide for forward drive of high power and torque which can be used in an emergency, as well as reverse drive of substantial power. The mechanism herein disclosed affords both of these drives in addition to the normal forward drive in a very efficient and convenient manner, and these features will next be described.

The central gear 66, instead of being keyed to or permanently rigid with the driven shaft 20, is shown connected through special mechanism to permit the drive to be selectively adjusted either to the normal forward drive as described, or to the emergency slow forward drive, or the slow reverse drive referred to. Thus the central gear has its hub keyed to a sleeve 67 loosely surrounding the driven shaft. This may be referred to as the front sleeve of the mechanism, and at its rear end it is formed into or carries a front bevel gear 68. This bevel gear is shown engaged with four bevel pinions 69 mounted on the four pinion studs 25 extending through the driven shaft, so that the pinions revolve bodily around with the driven shaft. To the rear of these parts is shown a second or rear bevel gear 70, also engaging the four pinions 69, this gear being formed or carried on a rear sleeve 71 also loose upon the driven shaft. With this arrangement torque can be delivered to the driven shaft only through the bevel pinions and studs 25 carrying them. The described arrangement permits the following advantageous mode of altering the drive. Obviously if the front and rear sleeves 67 and 70 are in some manner coupled or clutched together to prevent relative rotation this will prevent rotation of the pinions, so that in effect the sleeves, gears and pinions constitute a rigid part of the driven shaft, with the result that the torque transmitted to the central gear 66 effects forward or normal drive of the driven shaft.

If however the front and rear sleeves be relatively uncoupled, thus disengaging the normal drive, and if the rear sleeve be held stationary or anchored, then the forward rotation of the central gear and front sleeve acting through the front bevel gear and the bevel pinions will result in a forward drive of half the normal speed and of double the driving power or torque.

If on the other hand the two sleeves are uncoupled from each other and from the driven shaft but are combined with a set of reversing connections or gears cooperating with the rear sleeve, for example between the front and rear sleeves, then the driven shaft can be made to turn reversely at low speed and with high torque; these reversing connections being such as to rotate the rear sleeve and bevel in the reverse direction and at a speed slightly greater than the forward rotation of the front sleeve, thus giving low driven speed at high torque.

An illustrative mechanism embodying these principles and operating as described will now be explained.

The rear sleeve 71 has pinned to it a surrounding hub 73 which is thus practically a part of the sleeve, the hub having a flange 74 extending outwardly near its front end and a cylindrical extension 75 which extends forwardly, surrounding the driven shaft enlargement 24, and at its front end is provided with teeth 76 constituting a gear taking part in the reverse drive as will be explained. Attached to the hub flange 74 by a combined rivet and bolt 77 is an outwardly extending web 78, the periphery of which is formed into a drum or rim 79, the web and rim constituting a brake wheel adapted to be brought frictionally to rest to impose the slow forward drive as already explained.

The connections from the hub of the central gear 66 may be as follows. This hub has an outward flange or web 81, located just to the rear of the enclosing ring 14 of the driving parts, and this web at its outer extremity is formed into a cylindrical extension 82 provided with teeth 83 constituting an internal gear located directly outwardly of the gear 76 on the cylindrical extension of the rear hub 73. Between the gears 76 and 83 is a system of six planetary pinions 84, which turn idly during slow forward drive when the friction drum 79 is anchored, but which are operative during normal forward drive and reverse. The several pinions 84 are mounted on short studs 85 extending between a bridging ring 86 at the front and a revoluble support 87 at the rear.

This planet stud support 87 runs loosely during slow forward drive, but for the other drives is controllable for example by the following mechanism. The annular support 87 is formed as an integral flange upon a hub 88 to which is pinned a lining sleeve 89 surrounding and turning loosely upon the cylindrical extension 75. The hub 88 has keyed to it an outer hub 90 formed with an offset flange 91 to which is riveted the web 92 of a second friction wheel or brake drum 93, arranged adjacent to and forward of the brake drum 79.

The front brake drum 93 may be referred to as the reverse drum and the rear drum 79 as the slow drum. When the reverse drum is brought frictionally to rest this anchors the train of parts 85 to 93, so that the planet studs 85 are stationary and the pinions thereon operate as a reverse gear. The action will be apparent from Fig. 3. If the pinion studs 85 are stationary the rotation of the surrounding internal gear 83, which is turned by the central gear 66, will effect the rotation of the pinions and thereby the opposite rotation of the ring gear 76 and thereby the corresponding rotation of the hub 73 and rear sleeve 71. With the pitch diameters of the gears 83 and 76 in the ratio of 3 to 2 it follows that the rear sleeve 71 will be turned at a greater speed than the front sleeve 67, the speed ratio being 2 to 3, and the rear sleeve turning in the opposite direction to the front sleeve, so that the driven shaft, through the bevel gears and pinions, will be turned reversely at a slow speed and at a high torque.

For each forward turn of the front sleeve and bevel gear there will be 1½ reverse turns of the rear sleeve and bevel gear, resulting in a reverse turn of the driven shaft of ¼ rotation; the reverse drive therefore being at ¼ speed and four times the torque of the normal forward drive, other conditions being the same.

The normal forward drive adjustment may now be described and explained. As before suggested the plan hereof is to couple or clutch together in any manner the central gear or front sleeve with the driven shaft, either directly, or, as herein shown, indirectly by coupling together the front and rear sleeves and bevel gears, thus rendering this entire system rigid with the driven shaft. While this might be done in various ways it is herein shown as conveniently effected by the clutching together of the two friction wheels or drums 79 and 93, or their webs 78 and 92, a clutch 95 being shown for this purpose, accommodated within the interior of the rear or slow drum 79. An abutment wall 96 is connected by a cylindrical wall 97 with the web 78 of the drum 79, forming a chamber within which the clutch 95 is located. One element of the clutch consists of a centrally arranged ring 98 connected at two or more points by studs 99 to the web 92 of the front or reverse drum. The remainder of the clutch comprises a pressure ring 100 normally pressed forwardly, with lining rings 101 between the pressure ring and the center ring and between the center ring and the abutment wall, so that when pressure is applied to the ring 100 the two drums are frictionally coupled together. Preferably the drums are normally so coupled and for this purpose there is shown a system of twelve pressure springs 102 all bearing forwardly against the pressure ring 100 and each accommodated within a cylinder composed of an interior portion 103 extending through an aperture in the web 78 and flanged in front of the aperture, this interior cylinder being threaded and engaged by a threaded exterior cylinder 104 which therefore confines the spring under strong compression, which may be adjustable if desired. The clutch pressure need not be excessive; indeed, being interposed between two sets of parts tending to rotate oppositely, the effectiveness of the clutch is enlarged, so that only light springs are needed and only a light pedal pressure is necessary to unclutch it. The clutch hereof is not to be confused with the usual automobile clutch, which must be unclutched for any speed ratio changes or to stop the vehicle, while the clutch or coupling hereof need be released only to apply the emergency slow drive or reverse.

The operation with the clutch or coupling 95 applied or closed will be as follows. The two drums and their webs are clutched together and compelled to rotate as one. Therefore the planet stud support 87 and the ring gear 76 are compelled to revolve in unison, the result of which is that the planet pinions 84 are unable to rotate on the studs. This in turn renders the hub of the central gear 66 and its flange 81 substantially rigid with the other parts referred to. In consequence the front and rear sleeve 67 and 71 and their bevel gears are in rigid relation, so that the bevel pinions do not rotate but the driven shaft 20 is compelled to turn in unison with the described parts. In other words the action is as though the central gear were coupled directly to the driven shaft, so long as the clutch 95 is maintained closed by the pressure of the springs 102.

As previously explained it is necessary to uncouple or free the drums 79 and 93 from each other for the purpose of their independent action in imposing slow or reverse drive. A clutch loosening or opening means may conveniently be as follows. Attached to the rear side of the pressure ring 100 is a series of four angle plates 106, the outstanding portion of each extending through a square opening 107 in the drum web 78. Outside of the web there is pivotally attached to each angle plate a lever 108. The short or outer arm of the lever carries a contact screw 109 adapted to bear against a wear plate 110 riveted to the web. The contact screw 109 may be adjusted so as to control the degree of relaxation of the clutch and when adjusted is secured by a headed screw 111. The long arm of each of the four levers 108 extends radially inward, its free extremity having a convex head or contact 112. The several heads 112 bear against a flange or series of lugs 113 formed upon an axially sliding sleeve 114 surrounding and splined to the hub 73 so as to rotate with the rear drum while capable of axial sliding. Manifestly when the sleeve 114 is shifted rearwardly this pulls upon the long arms of all of the levers 108, which thereupon, through the angle plate 106 withdraw the pressure plate 100 toward the rear, thus removing the clutching pressure and releasing the drums for free relative movement.

Next will be described the connections for rearwardly sliding the lever operating sleeve 114, including the control lever or pedal for effecting the opening of the main clutch 95 against the pressure of the clutch springs 102; then the two friction devices or brake straps for bringing to rest and anchoring the respective drums 79 and 93, and the connections thereto from the control pedal, and the selective devices by which one or the other of the drums may be anchored at will to impose slow forward or reverse drive.

The sliding sleeve 114 is shown as having a flange member 116 removably attached or screw threaded to its rear extremity. A thrust bearing 117 is shown in contact against the front side of the flange 116. A pair of thrust contacts 118 are arranged on opposite yoke arms 119 to bear against the front race of the bearing 117. The yoke arms constitute a shipper and are operated through a skipper shaft 120 to which the two arms are keyed. This shaft extends through the enclosing casing of the transmission and takes its bearings in suitable apertures in the conical casing wall 40. At the left side of the casing the shaft projects and there is provided with a rock arm 121 by which the shaft may be oscillated. The arm 121 is shown connected by a link 122 to a rock arm or crank 123 secured near the fulcrumed end of a pedal lever 124 mounted on an axle 125. The pedal lever extends forwardly and upwardly from its fulcrum, and the arrangement of the connections 121—123 is such that when the pedal is depressed the link communicates the motion from the upper to the lower rock arm, thus rocking the latter downwardly and swinging the yoke rearwardly to shift the sleeve 114 and remove the friction pressure of the clutch 95. Moreover the arrangement resembles the action of a toggle in that the upper rock arm 123 and the link 122 approach alinement as the pedal lever is depressed. The yoke arms therefore are given an extended movement in the first part of the depression of the pedal, this movement slowing up so that the latter part of the pedal depression is in effect a dwell. The purpose of this is that the pedal, during the first part of its depression, may release the drum clutch 95, and following the release, during the dwell, effect the braking of one or the other of the drums to impose slow or reverse drive. The toggle arm and link 123, 122 might be replaced by a cam having an active incline followed by a dwell. The upper end of the pedal lever is curved around forwardly, its extremity carrying a foot piece 126 as shown in the detached part of Fig. 5. In order to permit regulation of the timing of the releasing of the drum clutch 95 the rock arm 123 may conveniently be angularly adjusted with respect to the pedal lever, for example as follows. The rock arm is formed on a separate sleeve or collar 128 which also has formed with it a T-shape extension 129 lying alongside the pedal lever and formed with offset lugs 130 each provided with a set screw 131 bearing against an edge of the lever, so that one screw can be loosened and the other tightened to change the relative position and timing of the collar and rock arm.

As already indicated the pedal lever has two ranges of movement. In the first part of its descent it opens the clutch 95 and during the remainder of its movement it effects the braking of one or the other of the drums 79 and 93 as will be described; and it is readily possible to depress the pedal far enough to release the clutch without braking either drum, so that in this intermediate adjustment the driven shaft is disconnected and free running, as is sometimes desirable in the driving of a vehicle or other apparatus.

Figure 4:
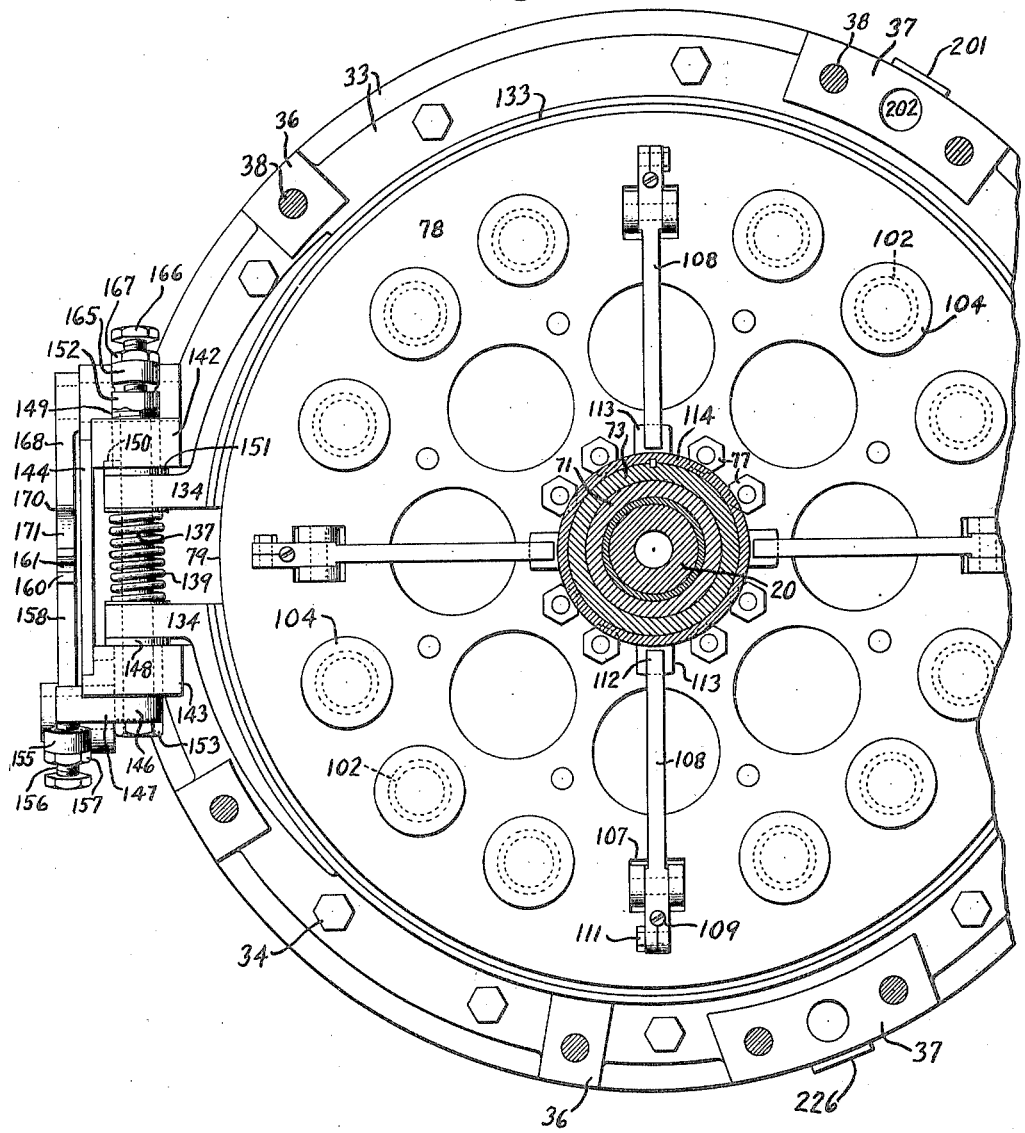
Fig. 4 is a similar transverse section taken on the plane 4—4 of Fig. 1.

The preferred means for frictionally braking and anchoring the friction wheels or brake drums consists of brake bands surrounding the drums, namely the rear brake band 133 on the drum 79, the same having outstanding lugs 134, and the front brake band 135 on the drum 93, having lugs 136. These brake bands are indicated in Figs. 1 and 4 as each consisting of the usual steel band, with friction lining, and the terminals provided with the lugs 134 or 135, through which the compression and applying of the band is effected. The rear brake band 133 is provided with a vertical rod 137 extending through its two lugs, while the front brake band lugs have a similar rod 138 extended through them. In each case the rod is surrounded by a coil spring 139 constantly pressing apart the lugs and thus tending to release the band.

The brake band lugs, rods and springs are shown accommodated in a box like frame extension 141 having a top wall 142, bottom wall 143 and cover plate 144.

The rear rod 137 is formed with a lower enlargement or head 146 having an offset extension 147 arranged to slide in a slot in the bottom wall 143. A washer 148 may be placed between the rod head and the lower brake band lug. The upper end of the rod, above the top box wall slides freely through a threaded fitting 149. The lower end of the fitting constitutes an adjustable stop for the top band lug, and has notches engaging a tooth 150 on a washer 151 above the lug, so as to hold the fitting at each half turn of adjustment. By pressing upwardly on the offset 147 of the rod 137 this presses upwardly on the lower lug 134 of the rear brake band and thus applies the band forcibly to the drum 79 to bring it to rest to impose slow drive.

The front rod 138 is reversely arranged, namely with its enlarged head 152 at its upper end and the remaining fittings of the other rod including threaded fitting 153 in reverse arrangement. By pressing downwardly upon the head 152 the upper brake band lug 136 is forced downwardly compressing the spring and tightening the front brake. In each case the direction of tightening is in the direction of rotation of the drum to be braked.

The mechanism for effecting the brake applying operations may be as follows. A bell crank lever is shown mounted on a boss on the lower box wall 143, one arm 155 of the bell crank carrying an adjustable contact screw 156 held in position by set nut 157, this screw being in position to thrust upwardly on the offset 147 of the head of the rod 137, for applying the rear brake band. The other arm 158 of the bell crank lever is shown extending upwardly, having a spring 159 constantly pulling on the lever so as to hold the contact screw 156 up against the rod head. The upper lever arm is also formed with a rearwardly extending finger or guard 160 affording a bearing surface for a pusher later to be described, and terminating in a pocket 161.

The other brake band is provided with a similar bell crank lever having an upper arm 165 carrying a screw contact 166 held by a set nut 167, the other arm 168 extending downwardly where it is pulled by a spring 169 and provided with a finger or guard 170, the surface of which terminates in a recess 171.

By this arrangement the throwing forwardly of the lever arm 158 will apply the rear brake for slow drive, while the throwing forwardly of the lever arm 168 will apply the front brake for reverse drive. These motions may be selectively effected from the pedal through an elongated pusher arm 174 fulcrumed at 175 on the pedal lever and having a spring 176 pulling the arm rearwardly, the parts being designed and arranged so that the lower contact end of the arm bears downwardly upon the finger 160 of the bell crank arm 158. If the pedal lever be thrown down with the parts in this position the arm 174 will slide rearwardly along the finger 160 into the pocket 161 and therebeyond will effect the swinging of the arm 158 and the applying of the slow drive brake band. The first or idle part of this motion is synchronous with the clutch releasing motion produced in the first part of the descent of the pedal lever as already described, so that the complete throw of the pedal lever first releases the clutch and then applies the slow drive. This is what occurs when the foot is applied and pressed upon the foot piece 126 of the pedal lever.

To afford the ability to shift selectively to the reverse brake band the pusher arm 174 is shown in the form of a bell crank having a second arm 177 extending upwardly along the brake lever. Another lever fulcrumed at 179 has a lower arm 180 arranged to contact and lift the arm 177, and has an upper arm 181 which is curved around in conformity with the shape of the pedal lever and carries a foot piece 182 at its upper extremity, the arm being slotted at 183 to receive headed bolts 184 outstanding from the main pedal lever, so as to maintain the two in alinement. The supplemental foot piece 182 is arranged above and partly in line with the main foot piece 126, so that when the supplemental foot piece is depressed it eventually meets and depresses the main foot piece to throw the pedal lever. The preliminary depression of the foot piece 182 operates through the described leverage to throw the pusher arm 174 from the full line to the dotted line position of Fig. 5, where it contacts against the finger 170 of the arm 168, so that the subsequent depression of the main foot piece and pedal lever will bring about the throw of the arm 168 instead of the arm 158 and will thereby apply the reverse or front brake band 135 to impose reverse drive.

The described structure lends itself to an automatic lubricating system. Such a system is herein disclosed and operates to maintain an oil supply to all working parts of the mechanism with the exception of the friction clutch and the brake drums all of which are protected behind the wall 35. An oil admitting pipe 200 entering the casing at plug 201 is indicated at the upper side of the casing element 34, delivering forced feed. The oil so admitted flows into a channel 202, indicated in Figs. 1 and 4, which supplies the oil both to the front and rear parts of the transmission. The rear end of passage 202 delivers into a passage 203 extending inwardly between ribs 204 at the inner side of the casing wall 40, this passage closed by a strip or plate 205 soldered to the ribs. The passage 203 delivers into an annular passage 206 surrounding the driven shaft, there being a series of radial holes 207 for conveying the oil into the longitudinal central channel 208 running through the driven shaft. A forward extension 209 of the wall 40 bridges across the thrust bearing 72 located to the rear of the rear sleeve 71, and carries oil excluding packings at both ends; and such packings are indicated at various other points, and require no special mention. Oil from the lower part of the extension wall 209 may drain into a downward passage 210 formed similarly to passage 203. Oil accumulating in the lower side of the annular recess 206 is able to feed through toward the rear and lubricate the bearing 28. Oil accumulating in the casing 41 may drain back through a passage 211 into the downward passage 210, the latter connecting with an exit channel 212.

The oil traveling through the driven shaft passage 208 may flow outwardly at various points for lubricating various parts. For example oil holes 213 are indicated in the bevel pinion studs 25, oil passing outwardly by centrifugal force and thus feeding to the bevel pinions and the gears which mesh with them; and other holes, to the sleeve 67 and 71 etc.

At the front end of the entrance channel 202 is shown a channel 216 directed inwardly along the division wall 35. This channel is formed by ribs 217 and covering strips 218. An aperture with the deflector 219 tends to deflect some of the oil forwardly toward the planet studs 12 which carry the rotors, these receiving the oil in interior passages 220 having radial openings into recesses 221 in the bearing sleeves or bushings 63 which in turn are perforated to deliver oil to the bearing linings 62. The lowermost end of the downward passage 216 is shown as having an opening 222 which delivers upon an outstanding plate 223 attached to and rotating with the driving parts, so that centrifugal force is operative to throw outwardly the lubricant received on this plate, some of it thereby being fed to the rotor studs and to the planet gears 60 turning with the rotors and thereby to the idler pinions 65 and the central gear 66. A guard ring 224 is arranged adjacent the support 87 for the planet pinions 85, so that oil received in the gear system 76, 83, 84 will be delivered therefrom in a forward direction and excluded from access to the clutch and drums. Along the lower part of the wall 35 is indicated a downwardly extending channel 225 by which surplus oil can flow into the discharge channel 212, which may be drained when desirable by a bottom plug 226. It will be understood that a substantial quantity of oil is maintained in the transmission, although not so much that when at rest there will be danger of the level rising high enough to pass over the division wall 35 into the compartment containing the drums and clutch. To minimize splashing and resistance of the oil by the rotors dipping through it the latter may have interposed between them triangular filling blocks so as to give a smooth submergence and emergence of the rotors. Constant recirculation may be promoted by drawing oil from the casing 32 under its centrifugal pressure and conducting it by pipe 200 to the plug 201, giving forced feed to all parts as described.

The operation and control have been quite fully described during the description of the structure. The normal forward or direct drive of the apparatus is in effect as long as the engine speed is sufficiently high and unless the pedal is depressed. When the pedal is depressed through its main foot piece 126 this throws out the clutch 95 which normally maintains the direct drive and brakes the drum which imposes the slow drive. When the pedal lever is depressed by the foot piece 182 it is the front or reverse drive drum which is braked so that the drive is in the reverse direction. It will be noted that in the case of both the slow and reverse drives, as with the normal or direct drive, the transmission is through the planetating rotors and the centrifugal masses therein. This feature is important and insures that there is no idle or wasteful planetation of masses during any of the three drives. Whenever the transmission is employed in a manner to brake the travel of the vehicle by the engine, in other words allowing the momentum of the driven parts to drive the engine, the rotors will planetate in the opposite to the usual direction as already described. This is possible by reason of the nature of the rotors and the pockets or abutments therein, which are reversible in action and capable of thrusting the masses inwardly in either direction of rotation. In other words the rotor system is double acting.

It is to be understood that the present invention is not to be limited to the transmitting rotors illustrated. The system might for example be more nearly like said prior Patent 1,546,404, for example Fig. 2ª, where a plurality of pockets are in operation each carrying the mass inwardly in a planetary manner but discharging it across the intervening space to an outward position. The single abutment in each rotor channel hereof therefore might be replaced by two or three or more such abutments, each having a wall extending in each direction so as to form pockets facing in both directions, and each pocket discharging across to another pocket as in said patent. For that matter, so far as concerns the feature of alteration from normal to slow drive and to reverse, the character of drive between the engine shaft and the central gear or forward sleeve might be of substantially any character, for example a simple gearing, or even a direct coupling. When under normal drive the front sleeve and driven shaft are in effect coupled together, and while this is herein done indirectly, by clutching together the two driven webs, and involving the reverse gearing, it might be done more directly, namely between the two sleeves (the subject of a copending application) or even by coupling the front sleeve or central gear directly to the driven shaft. The slow gearing 68, 69, 70 between the two sleeves is preferably as shown, but bevel gears are not essential, and each gear 69 on the driven shaft might be replaced by one or two gears of other kind, on a lateral axis at right angles or other angle to the driven shaft. So too the reverse gearing 83, 84, 76 may be replaced by other gearing, with each gear 84 replaced by one or two gears on an axis parallel or at an angle to the driven shaft. Or the reverse gearing may be shifted to operate (the subject of a copending application) between the rear sleeve and the driven shaft.

It will thus be seen that there has been described a power transmission apparatus embodying the principles and attaining the objects and advantages of the present invention. Since many matters of combination, operation, arrangement, structure, design and detail may be variously modified without departing from the principles, it is not intended to limit the invention to such matters except to the extent as set forth in the appended claims.

What is claimed is:

1. Power transmission apparatus comprising the rotary driving and driven members, a support revolved by the driving member, a system of co-acting centrifugal masses and mass thrusting means on the support, and connections between the driven member and thrusting means for applying the driven load resistance to the thrusting means, whereby the reaction of the centrifugal force of the masses is transmitted as torque to the driven member, said connections comprising an intermediate rotary member receiving the torque developed by the masses, a first bevel gear turned by said intermediate member, a second bevel gear opposed to the first, a bevel pinion mounted on a transverse axle on the driven member and engaging said bevel gears, a brake-wheel connected to the second bevel gear and means for braking it to render the second bevel gear stationary to impose slow forward drive, a second brake wheel, means for braking the second brake wheel to impose reverse drive, a reversing pinion connected to the second brake wheel, reversing gears engaging the reversing pinion and connected respectively to the intermediate member and second bevel gear, and means for clutching together the two brake wheels to impose normal forward drive.

2. Power transmission apparatus comprising the rotary driving and driven members, a support revolved by the driving member, a system of co-acting centrifugal masses and mass thrusting means on the support, and connections between the driven member and thrusting means for applying the driven load resistance to the thrusting means, whereby the reaction of the centrifugal force of the masses is transmitted as torque to the driven member, said connections comprising a pinion shaft mounted at an angle upon the driven member, a pinion on said shaft, a first gear engaging said pinion and receiving the torque developed by the masses, a second gear engaging the pinion, means for preventing relative movement of said gears to impose normal drive on the driven member, means for holding the second gear against rotation to impose slow drive on the driven member, and means cooperating with or compelling reverse rotation of the second gear to impose reverse drive on the driven member.

3. A power transmission apparatus as in claim 2 and wherein the means for compelling reverse rotation of the second gear comprises an internal gear rotating with the first gear, an external gear rotating with the second gear, a planet pinion engaging said internal and external gears, a support for said planet pinion, and means for braking said support to render the pinion operative, whereby the second gear will turn reversely faster than the forward rotation of the first gear and impose slow reverse drive on the driven member.

4. Power transmission apparatus comprising the rotary driving and driven members, a first gear rotated forwardly by the driving member, a second gear, a pinion mounted on a shaft outstanding from the driven member and engaging both said gears, a holding extension connected to the second gear and means for holding it to render the second gear stationary to impose slow forward drive, means for coupling together the first and second gears to impose normal forward drive, and a reversing gearing between the first and second gears and means rendering it effective to compel reverse rotation of the second gear and thereby impose reverse drive, said reversing gearing comprising a planet pinion, a gear turning with the first gear and engaging said planet pinion, a gear turning with the second gear and engaging said planet pinion, a supporting extension on which the planet pinion is mounted and means for holding said extension to impose reverse drive.

5. Power transmission apparatus comprising the rotary driving and driven members, a first gear rotated forwardly by the driving member, a second gear, a pinion mounted on a shaft outstanding from the driven member and engaging both said gears, a holding extension connected to the second gear and means for holding it to render the second gear stationary to impose slow forward drive, a reversing gearing between the first and second gears and means rendering it effective to compel reverse rotation of the second gear and thereby impose reverse drive, and means for coupling together the first and second gears to impose normal forward drive; the means for coupling together the first and second gears to impose normal drive comprising a clutch between said holding extension and said supporting extension, and means for closing and opening said clutch; and the reversing gearing comprising a planet pinion, a gear turning with the first gear and engaging said planet pinion, a gear turning with the second gear and engaging said planet pinion, a supporting extension on which the planet pinion is mounted and means for holding said extension to impose reverse drive.

6. Power transmission apparatus comprising a first rotary member, a second rotary member, and a driven member, all turning on a common axis, a first inner gear and a first outer gear carried concentrically on the first rotary member, a second inner gear and a second outer gear carried concentrically on the second rotary member, a lateral shaft mounted on the driven member, an inner toothed member turning on said lateral shaft and engaging said first and second inner gears, an outer toothed member engaging said first and second outer gears, an outer rotary member on which said outer toothed member is mounted, means for coupling together said second and outer rotary members to impose normal forward drive on the driven member, means for holding said second rotary member to impose slow forward drive, and means for holding said outer rotary member to impose reverse drive.

7. Power transmission apparatus comprising a first rotary member, a second rotary member, and a driven member, all turning on a common axis, a first inner gear and a first outer gear carried concentrically on the first rotary member, a second inner gear and a second outer gear carried concentrically on the second rotary member, a lateral shaft mounted on the driven member, an inner toothed member turning on said lateral shaft and engaging said first and second inner gears, an outer toothed member engaging said first and second outer gears, an outer rotary member on which said outer toothed member is mounted, means for holding said second rotary member to impose slow forward drive, and means for holding said outer rotary member to impose reverse drive.

8. Power transmission apparatus comprising a first rotary member, a second rotary member, and a driven member, all turning on a common axis, a first inner gear and a first outer gear carried concentrically on the first rotary member, a second inner gear and a second outer gear carried concentrically on the second rotary member, a lateral shaft mounted on the driven member, an inner toothed member turning on said lateral shaft and engaging said first and second inner gears, an outer toothed member engaging said first and second outer gears, an outer rotary member on which said outer toothed member is mounted, and means for holding said outer rotary member to impose reverse drive.

9. Power transmission apparatus comprising a first rotary member, a second rotary member, and a driven member, all turning on a common axis, a first inner gear and a first outer gear carried concentrically on the first rotary member, a second inner gear and a second outer gear carried concentrically on the second rotary member, a lateral shaft mounted on the driven member, an inner toothed member turning on said lateral shaft and engaging said first and second inner gears, an outer toothed member engaging said first and second outer gears, an outer rotary member on which said outer toothed member is mounted, means for coupling together said second and outer rotary members to impose normal forward drive on the driven member, and means for holding said outer rotary member to impose reverse drive.

10. Power transmission apparatus comprising a first rotary member, a second rotary member, and a driven member, all turning on a common axis, a first gear carried by said first rotary member, a second gear carried by said second rotary member, a lateral shaft carried by the driven member, a toothed member turning on said shaft and engaging said first and second gears, means for effectively coupling together said first and second rotary members to impose normal forward drive on the driven member, and means for holding said second rotary member to impose slow forward drive.

11. Power transmission apparatus comprising the rotary driving and driven members, a support revolved by the driving member, a system of co-acting centrifugal masses and mass thrusting means on the support, and connections between the driven member and thrusting means for applying the driven load resistance to the thrusting means, whereby the reaction of the centrifugal force of the masses is transmitted as torque to the driven member; each of said masses consisting of flowing material, and each of said thrusting means comprising a hollow planetating carrier formed with channels for such masses, covers enclosing such channels, and means as welded joints sealing the same.

In testimony whereof, we have affixed our signatures hereto.

JOHN REECE.
FRANKLIN A. REECE.